US008832416B2

(12) United States Patent
Chen et al.

(10) Patent No.: US 8,832,416 B2
(45) Date of Patent: *Sep. 9, 2014

(54) METHOD AND APPARATUS FOR INSTRUCTION COMPLETION STALL IDENTIFICATION IN AN INFORMATION HANDLING SYSTEM

(75) Inventors: Wen-Tzer Thomas Chen, Austin, TX (US); Venkat Rajeev Indukuru, Austin, TX (US); Alexander Erik Mericas, Austin, TX (US); Mysore Sathyanarayana Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 262 days.

This patent is subject to a terminal disclaimer.

(21) Appl. No.: 11/753,005

(22) Filed: May 24, 2007

(65) Prior Publication Data
US 2008/0294881 A1 Nov. 27, 2008

(51) Int. Cl.
G06F 11/34 (2006.01)

(52) U.S. Cl.
CPC ...... *G06F 11/3409* (2013.01); *G06F 2201/885* (2013.01); *G06F 2201/865* (2013.01); *G06F 2201/86* (2013.01); *G06F 11/3471* (2013.01); *G06F 2201/88* (2013.01); *G06F 11/3476* (2013.01)
USPC ........................................................ 712/227

(58) Field of Classification Search
CPC ............ G06F 11/3476; G06F 11/3604; G06F 11/3612
USPC ..................................................... 712/227
See application file for complete search history.

(56) References Cited

U.S. PATENT DOCUMENTS

| 5,802,273 | A | 9/1998 | Levine et al. |
| 5,987,598 | A * | 11/1999 | Levine et al. ................. 712/227 |
| 6,338,159 | B1 * | 1/2002 | Alexander et al. ............ 717/128 |
| 6,415,378 | B1 | 7/2002 | Davidson et al. |
| 6,550,002 | B1 | 4/2003 | Davidson et al. |
| 6,574,727 | B1 | 6/2003 | Davidson et al. |
| 6,880,072 | B1 | 4/2005 | Giles |
| 7,047,398 | B2 * | 5/2006 | Kurihara et al. ............... 712/227 |
| 7,086,035 | B1 | 8/2006 | Mericas |
| 7,114,058 | B1 | 9/2006 | Trivedi |
| 7,152,152 | B2 | 12/2006 | Barrick |
| 7,257,657 | B2 | 8/2007 | DeWitt, Jr. |

(Continued)

OTHER PUBLICATIONS

Wikipedia: "Embedded System". May 22, 2007. 9 pages.*

(Continued)

*Primary Examiner* — Robert Fennema
(74) *Attorney, Agent, or Firm* — Matt Talpis; Mark P Kahler

(57) ABSTRACT

An information handling system includes a processor that executes multiple instructions or instruction threads within a software application program. The information handling system includes operating system software that manages processor system hardware and software in a multi-tasking environment. In one embodiment, the operating system manages instruction completion stall analysis software to determine the cause or causes of instruction stalls. In another embodiment, the stall analysis software cooperates with the operating system software to store instruction completion stall event data on a per instruction basis while the application program executes. The operating system software may cooperate with the stall analysis software to store instruction completion stall data in memory for later manipulation by system users or other software.

8 Claims, 3 Drawing Sheets

(56) References Cited

U.S. PATENT DOCUMENTS

| | | |
|---|---|---|
| 2004/0024994 A1 | 2/2004 | Kurihara et al. |
| 2004/0024996 A1 | 2/2004 | Le |
| 2004/0186982 A9 | 9/2004 | Becker |
| 2006/0179280 A1 | 8/2006 | Jensen |
| 2006/0190703 A1 | 8/2006 | Carrie |
| 2006/0224864 A1 | 10/2006 | DeMent |
| 2007/0083742 A1 | 4/2007 | Abernathy |
| 2007/0113053 A1 | 5/2007 | Jensen |

OTHER PUBLICATIONS

Aguilera—Towards a Cross-Platform Microbenchmark Suite for Evaluating Hardware Performance Counter Data—UT (Nov. 2004).
Ecen—Reorder Buffer—ADCD (Mar. 2005).
Kucuk—Low Complexity Reorder Buffer Architecture—ICS (Jun. 2002).
Intel, "Pentium® Pro Family Developer's Manual, vol. 3: Operating System Writer's Guide," Dec. 1995, p. B1-B6.
U.S. Appl. No. 10/210,358,"Analyzing Instruction Completion Delays in a Processor," Non Final Office Action dated Jun. 17, 2005.
U.S. Appl. No. 10/210,358,"Analyzing Instruction Completion Delays in a Processor," Notice of Allowance dated Dec. 14, 2005.
Norris, Frank. "RISC vs. CISC". Apr. 4, 2002. 17 pages. Obtained via atlas.kennesaw.edu/~fnorris/Risc_vs_Cisc.ppt.
Robinson; "Stallscope: Illuminating the Black Box", Workshop on Modeling, Benchmarking and Simulation (MoBS 2006), 33rd Annual International Symposium on Computer Architecture, Boston, Massachusetts Sunday, Jun. 18, 2006.

\* cited by examiner

METHOD AND APPARATUS FOR INSTRUCTION COMPLETION STALL IDENTIFICATION IN AN INFORMATION HANDLING SYSTEM

TECHNICAL FIELD OF THE INVENTION

The disclosures herein relate to information handling systems, and more particularly, to information handling systems that employ apparatus and methodology to determine reasons for instruction execution delays.

BACKGROUND

An information handling system (IHS) may include multiple processors for processing, handling, communicating or otherwise manipulating information. Each processor may itself include multiple processor cores that work together to process information such as instructions and data. A processor or processor core may include multiple execution units that work together to complete one or more instructions every clock cycle. The processor core or cores function cooperatively with a high level operating system (OS) or other software that manages the processing of instructions.

Instructions within the IHS are subject to stalls, delays, or other events that may negatively impact or otherwise interrupt instruction execution and thus delay completion. Instruction completion stalls reduce the overall performance of information handling systems. Under one definition, a stall cycle is any IHS clock cycle in which an instruction or instruction group does not complete. Completion stall analysis attempts to determine why a processor does not complete the execution of instructions in a timely fashion. In other words, completion stall analysis provides a method to determine the cause of instruction completion stalls, thus enabling potential corrective action by software or hardware. These instruction completion stalls may include a data cache miss (waiting for data from memory), a data dependency (waiting for data from another instruction completion), an execution delay (waiting for the completion of the current instruction), and other stall events. Determining the exact cause of instruction completion stalls can be particularly difficult in an information handling system that employs multiple processors with multiple instructions that execute simultaneously in a speculative and/or out-of-order manner. The precise cause of an instruction completion stall may not be known until the instruction completion stall ends and the particular stalled instruction finally completes execution. Current completion stall analysis systems may attempt to guess the cause of instruction completion stalls. Such a speculative completion stall analysis may use speculative counters to assist software in determining the ultimate cause of instruction completion stalls. One known methodology provides an aggregate stall count of the number of instructions that experience completion delays.

What is needed is a method and apparatus that provides more detailed information regarding the instructions that experience completion delays and that addresses the problems described above.

SUMMARY

Accordingly, in one embodiment, a method is disclosed for processing instructions in a processor of an information handling system. The method includes providing, by an instruction source, a group of instructions to a processor for execution. The method also includes determining, by the processor, if a particular instruction of the group of instructions is the next instruction to complete execution, thus designating a next to complete instruction. The method further includes determining, by the processor, if the next to complete instruction exhibits a stall event during its execution and, in the case of such a stall event during execution, storing in a memory store stall information relating to a cause of the stall event for the next to complete instruction. The method also includes storing, in the memory store, stall information for next to complete instructions that exhibit stall events on an instruction by instruction basis.

In another embodiment, an information handling system (IHS) is disclosed that includes an instruction source that stores a group of instructions. The IHS also includes a processor, coupled to the instruction source, that executes instructions in the group of instructions. The processor determines if a particular instruction of the group of instructions is a next to complete instruction. The processor also determines if the next to complete instruction exhibits a stall event during its execution. In the case of such a stall event during execution the processor stores in a memory store stall information relating to a cause of the stall event for the next to complete instruction. The processor stores stall information for next to complete instructions that exhibit stall events on an instruction by instruction basis.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Figure 1:
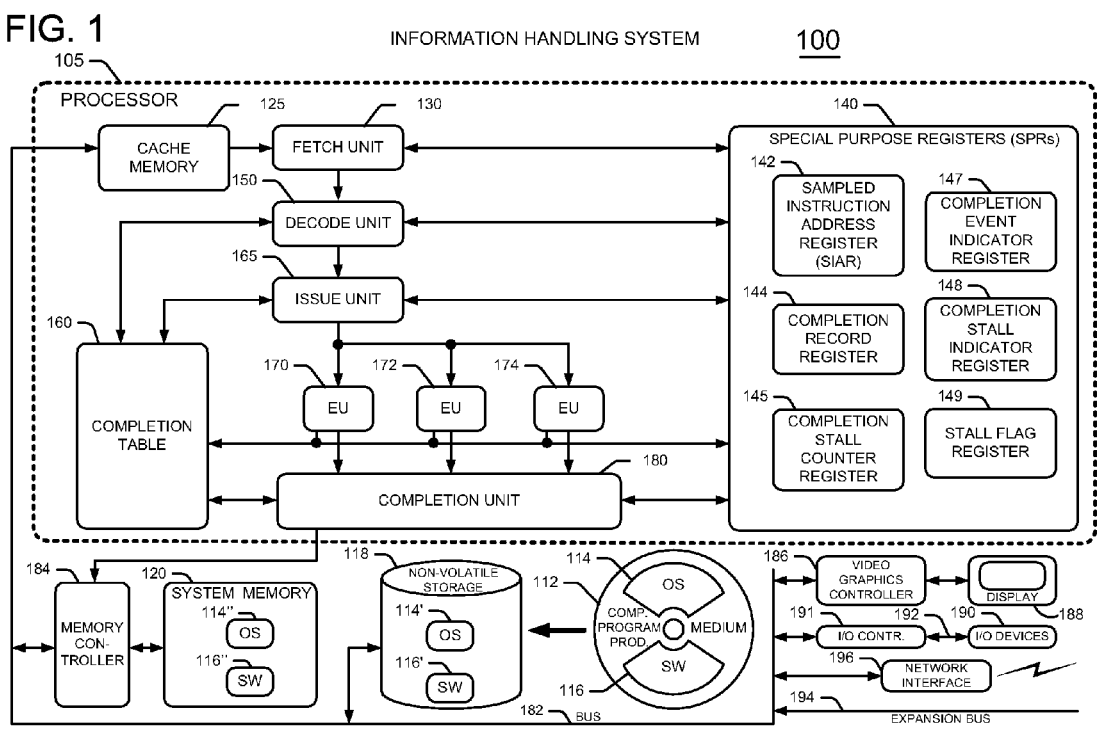
FIG. 1 is a block diagram of an information handling system that employs the disclosed instruction completion stall analysis methodology.

In many modern processors, multiple instructions load into the processor as a group of instructions. The total number of groups of instructions may exceed several thousand. To optimize processor speed performance, system designers need to determine the causes for completion delays of these instructions. Determining the causes for these execution completion delays is particularly challenging when evaluating a group of instructions because each instruction in the group may experience a completion delay for multiple different reasons. One approach for identifying and evaluating causes of instruction completion delays for groups of instructions in a processor is disclosed in the commonly assigned U.S. Patent Application 2004/0024994 A1 by Kurihara et al, entitled "Method and System For Identifying Instruction Completion Delays in a Processor", application Ser. No. 10/210,358, filed Jun. 31, 2002, the disclosure of which is incorporated herein by reference in its entirety. In one embodiment of this approach, the last instruction remaining to complete in a group of instructions is the instruction that delays completion of the entire group of instructions.

Some modern processors include a performance monitor unit (PMU). The PMU may contain one or more performance monitor counters (PMCs) that accumulate the occurrence of internal events that impact the performance of a processor. For example, a PMU may monitor processor cycles, instructions completed, or delay cycles that execute a load from memory. These statistics are useful in optimizing the architecture of a processor and the instructions that the processor executes. While advances in computer architecture such as speculative execution are of course desirable, these advances complicate monitoring events in processors. When a non-speculative processor executes a conditional branch instruction, the processor needs the results of the condition available before it can determine the direction of the branch. In contrast, speculative processors predict, or speculate, on the direction of the branch. At a later time when operands become available and the processor evaluates the condition, the processor determines if the prediction was correct. If the processor predicted the branch correctly, then execution continues. However, if the processor predicted the branch incorrectly, then the processor flushes the mispredicted instructions and begins fetching instructions along the correct path from the branch.

When such a misprediction occurs, the processor includes bad information, namely mispredicted instructions. Likewise, the PMC counters within the performance management unit (PMU) may contain incorrect values that require adjustment in the event of a misprediction. One method for adjusting the performance management counter (PMC) in a performance monitoring unit (PMU) within a speculative processor in the event of a branch misprediction is disclosed in the commonly assigned U.S. Patent Application 2004/0024996 A1 by Le et al, entitled "Speculative Counting of Performance Events With Rewind Counter", application Ser. No. 10/210,357, filed Jun. 31, 2002, the disclosure of which is incorporated herein by reference in its entirety. A control circuit maintains a correct value in the PMC within a speculative processor. In response to determining the beginning of speculative execution within the processor, the processor stores the value in the PMC in a rewind register. The PMC increments in response to predetermined events. If the processor determines that the speculative execution was incorrect, then the control circuit loads the value in the rewind register into the PMC, thus restoring the correct value in the PMC.

Conventional speculative instruction completion stall analysis methods may not have the ability to identify the particular instructions that stall. Such methods may also be unable to determine the respective precise causes for such instruction stalls.

FIG. 1 shows a simplified block diagram of the disclosed pipeline information handling system (IHS) 100 that employs instruction completion stall analysis methodology and apparatus to determine the particular instructions that stall in a processor and a respective reason for each stall. An IHS is a system that processes, transfers, communicates, modifies, stores or otherwise handles information in digital form, analog form or other form. IHS 100 includes a processor 105, such as a central processing unit (CPU), a synergistic processor unit (SPU), or other data processing unit. In one embodiment, IHS 100 includes a computer program product 112 that stores an operating system (OS) 114 that employs the disclosed instruction completion stall analysis methodology in a software program 116. While in the embodiment that FIG. 1 depicts, software program 116 is separate from OS 114, in another embodiment software program 116 is within operating system 114. Computer program product 112 may be in the form of a disk, cartridge or other storage media. A user loads computer program product 112 into a nonvolatile storage drive 118 that stores OS 114 and software program 116 as OS 114' and software program 116', respectively. Nonvolatile storage drive 118 may be a hard disk drive, compact disk (CD) drive, DVD drive, or other non-volatile storage that provides IHS 100 with permanent storage of information. Non-volatile storage 118 couples to a system memory 120 that loads the operating system as OS 114" and the software program as 116" as well as other operational software, instructions or thread data and information for use by processor 105. System memory 120 acts as a source of instructions that processor 105 executes.

System memory 120 couples to a cache memory 125 within processor 105 via a bus 182 and a memory controller 184. Cache memory 125 provides a local copy of portions of system memory 120 for use by processor 105 during IHS 100 operation. Cache memory 125 may include a separate instruction cache (I-cache) and a data cache (D-cache). Alternatively, cache memory 125 may store instructions along with data in a unified cache structure. Cache memory 125 may contain instruction or thread data or other memory data. Cache memory 125 couples to a fetch unit 130 to provide IHS 100 with instruction information for instruction processing. Fetch unit 130 couples to a bank or group of special purpose registers (SPRs) 140 that provide register information exchange under OS 114 control with one or more registers of IHS 100. Although SPRs 140 store specific register information for purposes of this example, other processor special purpose registers may store a wide variety of unique register assignments for information handling system operations. In yet another embodiment, one special purpose register may represent the total register support that IHS 100 requires for instruction completion stall analysis operation. In the example that FIG. 1 depicts, SPRs 140 include a "sampled instruction address register" (SIAR) 142, a completion record register 144, a completion stall counter register 145, a completion event indicator register 147, a completion stall indicator register 148, and a stall flag register 149. For purposes of this example, SPRs 140 are directly accessible by OS 114 software. In other embodiments, SPRs 140 may include scratch or temporary registers for use by processor 105 as temporary storage registers. SPRs 140 may be any type of accessible read and write memory in IHS 100. SPRs 140 act as a local memory store within processor 105.

Special purpose registers (SPRs) 140 provide valuable information regarding instruction stall events. OS 114 software may treat instructions as a group in IHSs such as POWER5-based IHSs or other instruction architecture IHSs. (POWER5 is a trademark of the IBM Corporation.) SIAR 142 contains the instruction address of the last instruction or instruction group to complete within IHS 100. As an instruction completes, the address of the completed instruction loads into SIAR 142. Instructions may execute within IHS 100 out of program order. For example, instructions may execute in a different order while the instructions reside in software program 116" of system memory 120. When an instruction or instruction group completes, completion record register 144 captures the instruction address, any completion stall clock cycle data, and stall condition data. Stall condition data represent stall conditions within IHS 100 that may be the cause of the stall, delay, or blockage of the last instruction. Completion stall counter register 145 stores data relating to the number of clock cycles that the next to complete instruction uses during instruction execution. IHS 100 architecture provides a sufficiently large completion stall counter register 145 to capture the worst case clock cycle length necessary for proper evaluation of instruction stalls. The completion event indicator register 147 stores a collection of event causes of instruction stall or stalls for an instruction or instruction group that is next to complete in IHS 100. Table 1 is a list of 11 representative instruction or instruction group completion stall event indicators. More completion stall event indicators, not shown, may exist in completion event indicator register 147.

TABLE 1

| | |
|---|---|
| 1 | Load/store instruction finished |
| 2 | Data cache miss |
| 3 | Translation cache miss |
| 4 | Load/store reject |
| 5 | Load/store flush |
| 6 | Fixed point instruction finished |
| 7 | Long latency fixed point instruction finished |
| 8 | Floating point instruction finished |
| 9 | Long latency floating point instruction finished |
| 10 | Branch mispredict |
| 11 | Icache miss |

As Table 1 shows, completion event indicator register 147 may store entry #1 or a load/store instruction finished entry that represents an instruction stall during a load or store operation of IHS 100. Completion event indicator register 147 may store a data cache miss entry, such as Table 1 entry #2, representing an instruction that fails to find memory data in cache memory 125. In this example, the data cache miss may require a load of the memory data from system memory 120 and thus need more clock cycles than an ideal memory cache lookup operation. Table 1 entry #3 represents an entry in completion event indicator register 147 for a translation cache miss, or translation cache address lookup failure for the next to completion instruction. In this case, IHS 100 uses more clock cycles to generate an address lookup from other memory sources in the IHS. Load store reject and load store flush entries #4 and #5 correspond to instruction stalls as a result of instruction load/store operational failures. Entries #6 and #7 relate to an instruction stall data entry in completion event indicator register 147 that involves fixed point calculations in IHS 100. A long latency fixed point instruction may be a fixed point multiply or divide instruction that causes an instruction stall or delay within IHS 100. Similarly, Table 1 entries #8 and #9 relate to instruction stalls that involve floating point calculations in IHS 100. A long latency floating point instruction may be a floating point multiply or divide instruction that requires multiple clock cycles to complete. Table 1 entry #10 represents an entry for completion event indicator register 147 that involves a branch misprediction event and subsequent instruction stall. Finally, Table 1 entry #11 represents an instruction cache (Icache) miss or the failure of the next to complete instruction to find a match in the instruction cache memory such as cache memory 125. Completion stall indicator register 148 contains the last completion event indicator as described in Table 1 above for the instruction that exhibits a stall condition and that was the next instruction to complete in IHS 100.

Fetch unit 130 couples to a decode unit 150 that provides IHS 100 with instruction decoding. IHS 100 decodes instructions coming from system memory 120 or other sources. Special purpose registers (SPRs) 140 couple to decode unit 150. A completion table 160 couples to decode unit 150 and provides instruction data for decoding by decode unit 150 within IHS 100. SPRs 140, decode unit 150 and completion table 160 all couple to issue unit 165 wherein instructions issue to the execution units of IHS 100. Issue unit 165 couples to each of representative execution units 170, 172 and 174. In actual practice, other embodiments of the processor may employ fewer or more execution units than representative processor 105. Each execution unit 170, 172, and 174 couples to completion table 160 and SPRs 140. Each execution unit 170 through 174 couples to a completion unit 180 to provide IHS 100 with instruction completion data. Completion unit 180 couples to completion table 160, SPRs 140, and registers 170, 172 and 174. Completion unit 180 also couples to system memory 120 via memory controller 184 to provide completion data, such as instruction completion information, for storage in system memory 120.

In one embodiment, IHS 100 represents a pipeline system with supporting hardware and software. Instructions advance through IHS 100 from stage to stage. For example, fetch unit 130, decode unit 150, and issue unit 165 represent the first three stages of pipeline IHS 100. Instructions move from cache memory 125 to the first stage or fetch unit 130 and so on through each successive stage. Execution units 170, 172, and 174 represent the next stage of the pipeline system after issue unit 165. The completion unit 180 represents the final stage of the pipeline system of IHS 100 in this example. The next instruction advancing through the final stage or completion unit 180 is the next to complete instruction. Since most pipeline systems complete an instruction each clock cycle, the next to complete instruction should ideally complete in the next clock cycle. IHS 100 incurs an instruction delay or stall during any clock cycle wherein an instruction does not complete.

In one example, OS 114 operates within IHS 100 to collect data from completion stall record register 145 and other SPRs 140 on a periodic basis. By capturing continuous instruction stall event data from the SPRs 140, a collection of instruction stall events accrues in system memory 120. System users or other resources can interrogate the accrual of instruction stall event data in system memory 120 to generate a representative analysis of instruction execution frequency, specific instructions that suffer a completion stall delay, and conditions of IHS 100 that cause the instruction completion stalls or delays. The accumulation and analysis of instruction by instruction stall event data presents opportunities for performance improvement within IHS 100. The disclosed embodiment identifies not only an aggregate stall count of stalled instructions, but also identifies the particular instructions that stall. By capturing instruction stall data concurrently with instruction execution, IHS 100 does not require speculative hardware and software such as rewind counters and instruction stall event guess software or logic. SPRs 140 store instruction stall information on a per stalled instruction basis. In other words, at some point in time, the registers in SPRs 140 include stall information for each respective stalled instruction of the instruction group or thread.

In one embodiment, computer program product 112 resides on a disk or other storage medium that includes an operating system (OS) 114 with the disclosed instruction completion stall analysis software 116 functionality. Computer program product 112 is a CD, DVD, other media disk, media drive, cartridge or other storage medium. A system user or other entity loads computer program product 112 on non-volatile storage 118 for storage therein. In this manner, non-volatile storage 118 stores the operating system with instruction completion stall analysis software functionality. When IHS 100 initializes or boots up, the OS with instruction completion stall analysis software functionality loads into system memory 120 for use by IHS 100 as OS 114" with stall analysis software 116". In this manner, the instruction completion stall analysis software is available for use by system users, programmers and other entities.

While FIG. 1 shows one IHS that employs the instruction completion stall analysis software methodology as IHS 100, IHS 100 may take many forms. For example, IHS 100 may take the form of a desktop, server, portable, laptop, notebook, or other form factor computer or data processing system. IHS 100 may also take other form factors such as a gaming device, a personal digital assistant (PDA), a portable telephone device, a communication device or other devices that include a processor and memory. The primary task of IHS 100 is the processing of software programs by execution of instructions as single instructions or instruction groups. IHS 100 uses the completion table 160 or a reorder buffer (not shown) to keep track of instruction execution or program order. IHS 100 includes a bus 182 that couples processor 105 to system memory 120 via a memory controller 184. A video graphics controller 186 couples display 188 to bus 182. Nonvolatile storage 118, such as a hard disk drive, CD drive, DVD drive, or other nonvolatile storage couples to bus 182 to provide IHS 100 with permanent storage of information. Operating system 114" loads in system memory 120 to govern the operation of IHS 100. I/O devices 190, such as a keyboard and a mouse pointing device, couple to bus 182 via I/O controller 191 and I/O bus 192. One or more expansion busses 194, such as USB, IEEE 1394 bus, ATA, SATA, PCI, PCIE and other busses, couple to bus 182 to facilitate the connection of peripherals and devices to IHS 100. A network adapter or network interface 196 couples to bus 182 to enable IHS 100 to connect by wire or wirelessly to a network and other information handling systems.

Figure 2:
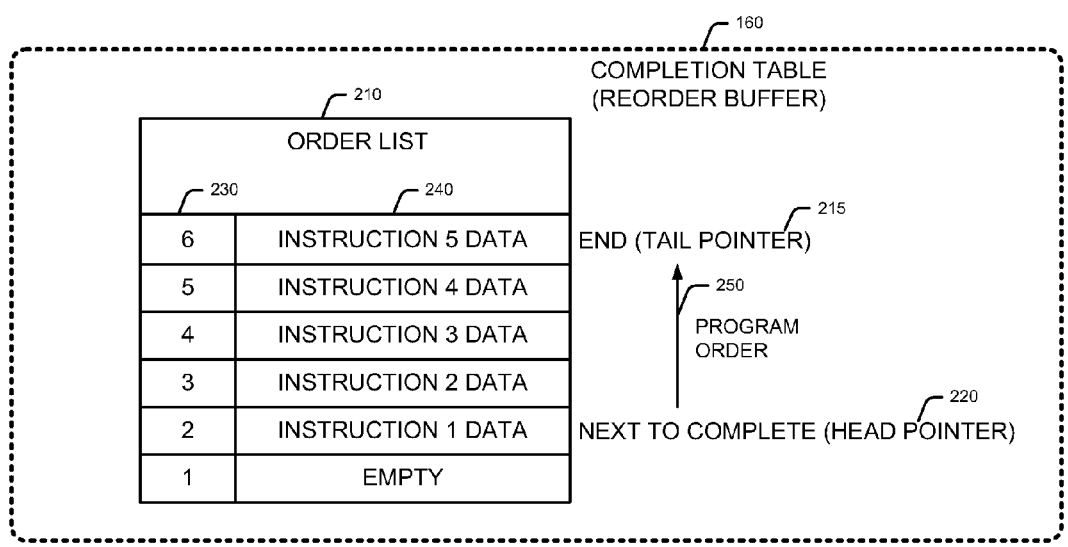
FIG. 2 shows a block diagram of a completion table or reorder buffer for use in the disclosed information handling system.

FIG. 2 shows one example of completion table 160, also known as a reorder buffer, that IHS 100 employs. The primary function of the completion table 160 is to provide information to OS 114 and other software in IHS 100 to put instructions back in their original program order as fetch unit 130, decode unit 150 and issue unit 165 provide. The completion table 160 maintains an order list 210 of instructions. OS 114 software adds instructions at one end of the order list when issue unit 165 provides instruction data thereto, and removes instructions from the other end of the order list 210 when complete according to completion unit 180. In this manner, instructions complete in the same order that fetch unit 130 fetches the instructions and completion unit 180 completes the instructions. OS 114 software increments an "end" or (tail pointer) 215 to add instructions to the completion table 160 order list 210. When a "next to complete" or (head pointer) 220 instruction catches up to the tail pointer 215, the reorder buffer 160 is empty. If the tail pointer 215 of completion table 160 wraps around and catches the head pointer 220, the reorder buffer 160 is full. Completion table 160 is a fundamental component of the pipelining architecture of IHS 100, particularly useful where instructions execute out of program order. A second instruction may execute per execution unit 170, 172 or 174 prior to a previous first instruction that began execution before the second instruction. Another way to describe the function of completion table 160 is that OS 114 stores instructions in completion table 160 in program order and completes the instructions per completion unit 180 in that same program order. The instructions may however execute per execution units 170, 172, or 174 in program order or any other order.

In the particular embodiment of FIG. 2, a completion table or reorder buffer 160 is a table that includes 6 entries. In practice, completion table or reorder buffer 160 may include more or fewer entries than 6. An entry number column 230 of completion table 160 depicts the entry numbers #1-#6 of each instruction data entry. For this example, entry #1 is empty as the instruction data column 240 "empty" entry of completion table 160 indicates. Completion table 160 entry #2 represents the next to complete instruction or next instruction through completion unit 180 for IHS 100. Completion table 160 entry #2 further represents the head pointer 220 or next instruction due for completion in IHS 100. The "instruction 1 data" entry in column 240 represents all data necessary to define instruction 1 as OS 114 software uses during instruction execution by execution units 170, 172, and 174. Each entry in the completion table 160 that represents an active instruction must contain sufficient information to enable completion unit 180 to determine whether a specific instruction should complete and in what order. Instruction 1 data of completion table entry #2 may contain bits such as issue bit, finish bit, the instruction address (or index to same address), and any branch instructions necessary to assist IHS 100 during recovery of a branch mispredict. Completion table 160 may store other bits or data that OS 114 requires for proper instruction execution and control.

Completion table 160 entry #3 represents the next instruction to complete after instruction 1. Completion table entry #3 contains instruction 2 data. Completion table 160 entry #4 represents the next instruction after instruction 2 to complete and contains instruction 3 data. Completion table 160 entry #5 represents the next instruction after instruction 3 to complete and contains instruction 4 data. Finally, completion table 160 entry #6 represents the next instruction to complete after instruction 4 completion and contains the last instruction, namely instruction 5 data. The instruction 5 data of completion table 160 entry #6 represents the end or tail pointer 215 of completion table 160. The order list 210 of instructions starting with instruction 1 data or completion table 160 entry #2 through completion table 160 entry #6 represents the "program order" as shown by the arrow 250 that indicates the sequential order of instructions for completion in IHS 100. As shown, important information such as next to complete instruction information can be readily found in completion table 160. When OS 114 software executes instruction completion stall analysis software, it may require next to complete instruction information during normal or other operation of IHS 100.

Figure 3:
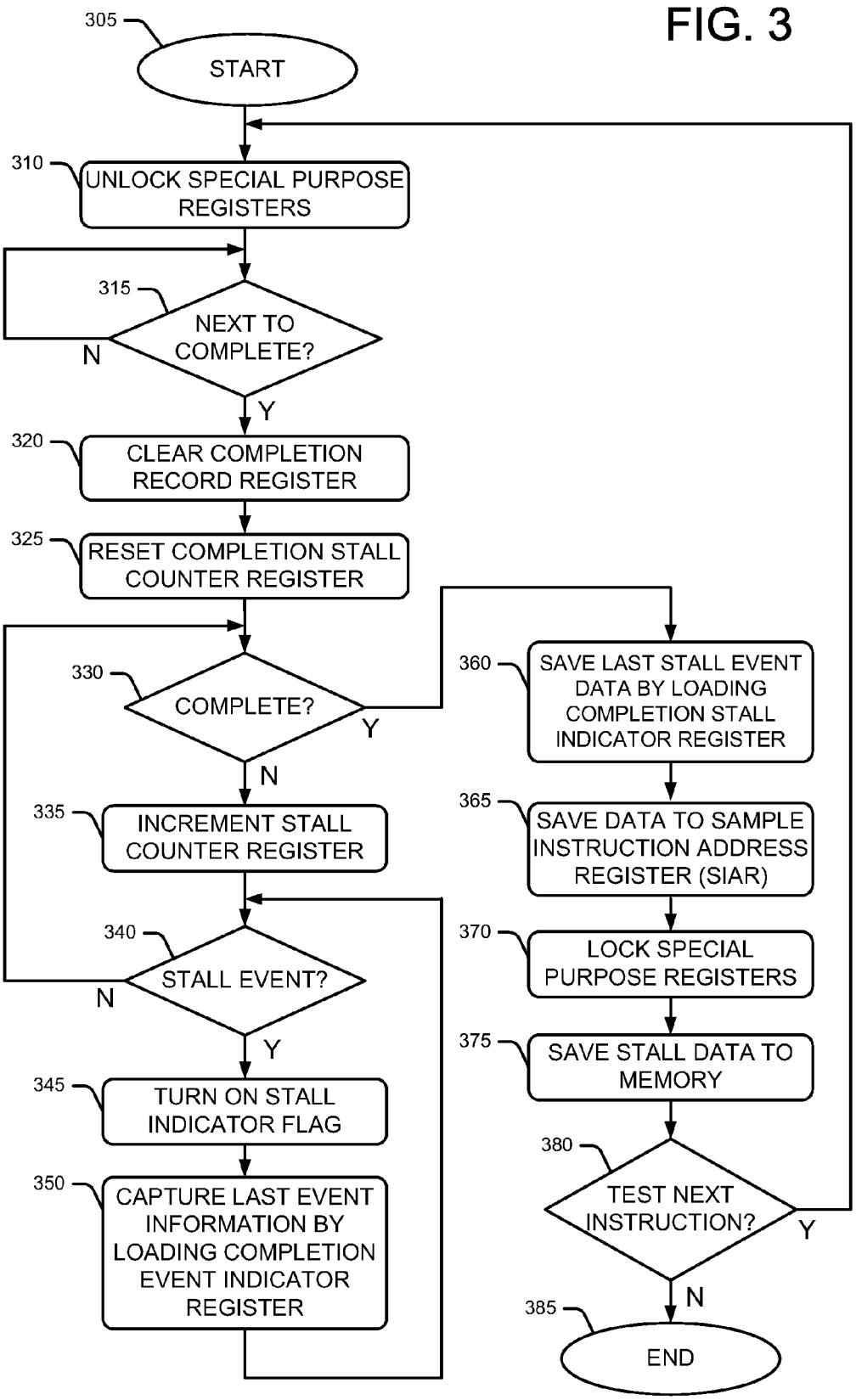
FIG. 3 is a flow chart that depicts one embodiment of the disclosed instruction completion stall analysis methodology.

FIG. 3 is a flowchart that depicts process flow in one embodiment of the instruction completion stall analysis software (SW) 116 that IHS 100 employs. More specifically, FIG. 3 shows the steps of a stall analysis of instruction operations within IHS 100. Stall analysis software 116 may be a standalone application or part of OS 114. One or more instructions reside in system memory 120 and execute under the control of operating system 114 and stall analysis software 116 within the IHS 100 hardware. Process flow begins at start block 305. The stall analysis software 116, in cooperation with OS 114, unlocks the SPRs 140, as per block 310. In this manner, the instruction stall data may load into specific SPRs 140 that stall analysis software 116 dictates. In one embodiment, if the instruction currently under execution by execution units 170-174 will not complete next, IHS 100 continues to process instructions in the order that OS 114 directs. In that case, decision block 315 continues testing for the next to complete instruction. When the instruction currently under execution by execution units 170-174 is the next to complete instruction, then the stall analysis software 116 in cooperation with OS 114 clears completion record register 144, as per block 320. In response to execution of the next to complete instruction, the stall analysis software 116 in cooperation with OS 114 resets completion stall counter register 145, as per block 325.

If the next to complete instruction currently executing in IHS 100 is not complete, decision block 330 increments completion stall counter register 145, as per block 335. The first increment of completion stall counter register 145 takes the count to "1". Stated alternatively, the next to complete instruction did not complete for one clock cycle more than in ideal conditions, thus indicating a potential stall condition. The next increment of completion stall counter register 145 takes the count to "2", thus representing a stall count of 2 for the next to complete instruction and so on. The stall counter register count thus represents the number of IHS 100 clock cycle iterations that software SW 116 determines the next to complete instruction to be not complete. The completion stall analysis software 116 determines if the instruction under current execution and that is next to complete exhibits a stall event such as those that Table 1 depicts. If the stall analysis software 116, in cooperation with OS 114, does not detect a stall event at decision block 340, then IHS 100 returns to testing for instruction completion again at decision block 330. However, if the stall analysis software 116 detects a stall event at decision block 340, then the stall analysis software 116 and OS 114 turn on a stall indicator flag in a stall flag register 149, as per block 345. A stall indicator flag may be an internal bit or bits in any IHS 100 register or memory, to indicate to IHS 100 that a stall condition exists.

Stall analysis software 116, in cooperation with OS 114, captures the latest stall event data by loading completion event indicator register 147 with the instruction completion stall event indicator data, such as the data of Table 1, as per block 350. Since multiple stall events can occur in a particular next to complete instruction, the stall event test per decision block 340 may repeat multiple times. Each stall event that stall analysis software 116 detects turns on the stall indicator flag again, as per block 345. Stall analysis software 116, in cooperation with OS 114, captures the latest stall event data by loading completion event indicator register 147 with the instruction completion stall event indicator data again, as per block 350. When the next to complete instruction completes, as per a positive result of decision block 330, the stall analysis software 116 saves the last stall event data in completion stall indicator register 148, as per block 360. The stall analysis software 116 then saves the instruction address of the last instruction or instruction group to complete in the sampled instruction address register (SIAR) 142, as per block 365. With the next to complete instruction now complete, stall analysis software 116 in cooperation with OS 114 locks the SPRs 140, as per block 370, such that the stall analysis software can interrogate the SPRs 140 and collect the latest instruction stall data. The stall analysis software 116 in cooperation with OS 114 saves the new instruction stall data with the collection of instruction complete stall data already in IHS 100 memory such as system memory 120, as per save stall data to memory block 375. By collecting and storing instruction stall data during program execution, the stall analysis software 116 in cooperation with OS 114 can avoid overwriting the existing SPRs 140 with the next instruction stall data. For example, the architecture of IHS 100 includes the ability to send an interrupt and collect the stall data from the SPRs before allowing any SPRs 140 overwriting and potential loss of valuable instruction stall data. In one embodiment of this methodology, completion stall counter register 145 increments to the point of overflow wherein the leftmost bit changes from a zero to a one. OS 114, or other software that monitors the completion stall counter register 145 leftmost bit change, signals fetch unit 130 to stop fetching from the current instruction or instruction group and fetches the exception handler software for counter overflow conditions. IHS 100 executes the interrupt driven exception handler software that collects the stall data from SPRs 140, thus clearing the SPRs 140 of data. The instruction address for the last instruction stall is available in SIAR 142 and the completion delay is available in the completion stall counter register 145. Stall event indicators such as those in Table 1 are available in completion event indicator register 147 and the last (final) stall event for the last instruction stall event is available in completion stall indicator register 148. In this manner, IHS 100 provides a wealth of specific diagnostic information with respect to a particular instruction stall. In other words, IHS 100 may provide detailed stall information on a stalled instruction by stalled instruction basis.

Stall analysis software 116 may terminate upon the request of the system user, OS 114, or other entity. Stall analysis software 116 in cooperation with OS 114 performs a test at decision block 380 to determine if the stall analysis software 116 will continue to test for stall events. If stall analysis software 116 in cooperation with OS 114 requests more testing, testing continues, as per block 310. In this case OS 114 unlocks the SPRs 140 again at block 310 and continues testing for instruction completion stall events. However, if stall analysis software 116 determines that the testing is complete at decision block 380, then the stall analysis software 116 methodology ends, as per end block 385.

With the collection of instruction stall event data in system memory 120, other analysis software can further utilize the stall event data to generate a useful understanding of instruction stall causes and remedies. Interrogating specific stall event registers 140 can provide useful problem tracking within IHS 100 hardware and software functions. In one case, a pattern such as 2 specific stall event indicators may occur prior to a specific instruction stall condition. This case provides system users with a detectable pattern for further evaluation of next to complete stall causes. Providing data for system users and programmers to modify hardware or software within IHS 100 to remedy instruction stall magnitude is one useful application of the instruction completion stall analysis software methodology.

Those skilled in the art will appreciate that the various structures disclosed can be implemented in hardware or software. Moreover, the methodology represented by the blocks of the flowchart of FIG. 3 may be embodied in a computer program product, such as a media disk, media drive or other media storage such as computer program product medium 112 of FIG. 1.

In one embodiment, the disclosed methodology is implemented as an application, namely a set of instructions (program code) in a code module which may, for example, be resident in system memory 120 of IHS 100 of FIG. 1. Until required by IHS 100, the set of instructions may be stored in another memory, for example, non-volatile storage 118 such as a hard disk drive, or in a removable memory such as an optical disk, floppy disk or other medium 112, or downloaded via the Internet or other computer network. Thus, the disclosed methodology may be implemented in a computer program product for use in a computer such as IHS 100. It is noted that in such a software embodiment, code that carries out the functions depicted in the FIG. 3 flowchart may be stored in system memory 114 while such code is being executed. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

The invention claimed is:

1. A method of processing instructions in a processor, the method comprising:
providing, by an instruction source, a group of instructions to the processor for execution, the processor including a special purpose register (SPR) bank;
unlocking, by a stall analyzer external to the processor, the SPR bank;
first determining, by the processor, if a particular instruction of the group of instructions is a next instruction to complete execution, thus designating the next to complete instruction;
second determining, by the processor, if the next to complete instruction exhibits a stall event during its execution and, in the case of such a stall event during execution, storing in the special purpose register (SPR) bank stall information relating to a cause of the stall event for the next to complete instruction, the SPR bank including a completion stall counter register that stores a worst case clock cycle length for instruction stall evaluation, a completion event indicator register that stores a collection of stall event causes of an instruction stall for the next to complete instruction, a completion stall indicator register that stores a last completion event indicator for the next to complete instruction that exhibits a stall condition, and a stall flag register that stores a stall indicator flag that indicates if the next to complete instruction exhibits a stall event;
completing execution, by the processor, of the next to complete instruction such that the next to complete instruction becomes a completed instruction;
storing, in the SPR bank, stall information for the completed instruction, wherein the stall information for the completed instruction includes multiple stall event causes when the completed instruction exhibits multiple stall event causes;
locking, by the processor, the SPR registers of the SPR bank;
retrieving, by the stall analyzer external to the processor, stall information periodically from the SPR bank to determine a cause of each stalled completed instruction;
storing, by the stall analyzer, the retrieved stall information in a system memory;
third determining, by the stall analyzer, an aggregate stall count of stalled completed instructions from the retrieved stall information;
fourth determining, by the stall analyzer, an instruction stall frequency of a particular instruction from the retrieved stall information,
testing, by the stall analyzer, the retrieved stall information to determine if there are multiple stall event causes of a stall of a particular completed instruction, and
repeating the unlocking, first determining, second determining, completing, storing in the SPR bank, locking, retrieving, and storing the retrieved stall information steps for subsequent next to complete instructions in the group of instructions to determine a stall event pattern by the stall analyzer.

2. The method of claim 1, wherein the second determining step further comprises incrementing a stall counter to determine an amount of time associated with the stall event in terms of clock cycles.

3. The method of claim 1, wherein the second determining step further comprises generating, by the processor, a stall indicator flag if the next to complete instruction exhibits the stall event.

4. The method of claim 1, wherein the causes of the stall event include at least one of a data cache miss, an instruction cache miss, a branch mispredict, a translation cache miss, a load/store reject, a load/store flush, a load/store instruction finished, a fixed point instruction finished, a long latency fixed point instruction finished, a floating point instruction finished, and a long latency floating point instruction finished.

5. The method of claim 1, wherein the group of instructions is an instruction thread.

6. An information handling system (IHS) comprising:
an instruction source that stores a group of instructions;
a processor, coupled to the instruction source, that executes instructions in the group of instructions, the processor including a special purpose register (SPR) bank that the processor unlocks,
a stall analyzer external to the processor that unlocks the SPR bank;
wherein the processor determines if a particular instruction of the group of instructions is a next to complete instruction,
wherein the processor determines if the next to complete instruction exhibits a stall event during its execution and in the case of such a stall event during execution the processor stores in the special purpose register (SPR) bank stall information relating to a cause of the stall event for the next to complete instruction, the SPR bank including a completion stall counter register that stores a worst case clock cycle length for instruction stall evaluation, a completion event indicator register that stores a collection of stall event causes of an instruction stall for the next to complete instruction, a completion stall indicator register that stores a last completion event indicator for the next to complete instruction that exhibits a stall condition, and a stall flag register that stores a stall indicator flag that indicates if the next to complete instruction exhibits a stall event,
wherein the processor completes execution of the next to complete instruction such that the next to complete instruction becomes a completed instruction,
wherein the processor stores in the SPR bank stall information for completed instruction, wherein the stall information for the completed instruction includes multiple stall event causes when the completed instruction exhibits multiple stall event causes,
wherein the processor locks the SPR registers of the SPR bank after the storing of stall information therein; and
a system memory, coupled to the processor, the memory being configured with the stall analyzer external to the processor that retrieves stall information periodically from the SPR bank to determine a cause of each stalled next to complete instruction, wherein the stall analyzer stores the retrieved stall information in the system memory, wherein the stall analyzer determines an aggregate stall count of stalled instructions from the retrieved stall information, wherein the stall analyzer determines an instruction stall frequency of a particular instruction from the retrieved stall information, wherein the stall analyzer tests the stall information to determine if there are multiple causes of a stall of a particular next to complete instruction;
wherein the IHS repeats the unlocking of the SPR registers, the testing of the stall information in the SPR registers, and the locking of the SPR registers such that the stall analyzer determines a stall event pattern in the completed instructions of the group of instructions.

7. The IHS of claim 6, wherein the special purpose register (SPR) bank stores at least one of the following causes of a stall for a particular stalled instruction, the causes including a data cache miss, an instruction cache miss, a branch mispredict, a translation cache miss, a load/store reject, a load/store flush, a load/store instruction finished, a fixed point instruction finished, a long latency fixed point instruction finished, a floating point instruction finished, and a long latency floating point instruction finished.

8. The IHS of claim 6, wherein the group of instructions comprises an instruction thread.

\* \* \* \* \*